2,804,470

PREPARATION OF CYANOFORMAMIDE

Richard Parke Welcher, Old Greenwich, Conn., assignor to American Cyanamid Company, New York, N. Y., a corporation of Maine No Drawing. Application January 27, 1956, Serial No. 561,926

10 Claims. (Cl. 260—465.4)

This invention relates to a new and novel improved process for the manufacture of cyanoformamide $$(CNCONH_2)$$

Cyanoformamide is a known compound which possesses good nematocide and rodenticide properties. Normally, it is a crystalline solid, soluble in common solvents, as for instance water and alcohol. In the molten state, it is a good solvent for polyacrylamide.

Nevertheless, cyanoformamide has remained largely a laboratory curiosity because its synthesis was commercially impractical. For instance, cyanoformamide is prepared by causing cyanogen to react with glacial acetic acid in the presence of about one-half percent of water while heating the mixture in a sealed tube. Prior to the present invention, control of minimal amounts of water was thought to be a prime requirement because oxamide as a principal product would otherwise form. Care was taken to insure the presence of minimal quantities of water. Notwithstanding these precautions, the reaction required several months to complete. Since cyanoformamide possesses commercially interesting properties, the search for an improved process for its production has continued.

It is an object of the present invention to provide an improved process for cyanoformamide production in the presence of substantial quantities of water. It is a further object to provide a novel synthesis for cyanoformamide manufacture in good yield and purity while effecting reaction within a practical time period.

These, and other objects, are attained in general by causing cyanogen to react with a mixture comprising at least one equivalent of water and one equivalent of an aliphatic carboxylic acid while heating the mixture under autogenous pressure. In the recovery of cyanoformamide, little or no oxamide is found in the product. In general, the reaction may be conducted at temperatures ranging from about 50° C. to 90° C. In this manner, reaction is completed in less than three days at the lower temperatures and less than five hours at the upper temperatures. However, where a lower temperature is used, say 40° C., reaction proceeds smoothly but a longer reaction time is required.

Although hydration of cyanogen will occur in the aforedescribed manner, the reaction will proceed more smoothly in the presence of an inert polar solvent for cyanogen. For instance, a solvent such as water, an aliphatic monocarboxylic acid, acetonitrile, tetrahydrofuran and mixtures thereof is employed advantageously as the solvent medium.

To obtain satisfactory yields within a maximum time period of several days, at least one equivalent of water per equivalent of cyanogen is required. Although a lesser quantity of water may be used, the yield of cyanoformamide is decreased appreciably. Advantageously, more than one equivalent of water for each equivalent of cyanogen is employed. Although it may be expected that oxamide would form as a principal product under such conditions of reaction, surprisingly little or no oxamide is detected. It is found that as much as sixteen and more equivalents of water can be utilized without oxamide formation.

The use of a variety of aliphatic carboxylic acid is within the purview and scope of the present invention. Thus, aliphatic monocarboxylic acids, aliphatic dicarboxylic acids, and aliphatic tricarboxylic acids are contemplated. Typically illustrative aliphatic carboxylic acids include: formic acid, acetic acid, chloroacetic acid, ricinoleic acid, oxalic acid, succinic acid, citric acid and the like. It has been found that the presence of at least one equivalent of the acid, and advantageously from one to two equivalents, will cause the obtainment of good yields of cyanoformamide product. Lesser quantities of acid tend to depress the yield of product.

In order to facilitate a further understanding of the invention, the following examples are given primarily for the purposes of illustrating certain more specific details thereof. The scope of the invention is not to be deemed limited thereby except as defined in the claims. Unless otherwise noted, the parts are by weight.

Example 1

A mixture of 15.5 parts of cyanogen, 21.6 parts of water, 30 parts of 91% formic acid and 60 parts of acetonitrile are fed into a pressure vessel. The mixture is heated to 74° C. for a total of seven (7) hours. Excess water, formic acid and acetonitrile are removed by vacuum distillation. Crystalline cyanoformamide residue is soluble in water and alcohol and melts at 47° C.–55° C. It is recovered in 79% yield. No oxamide is found in the product.

Example 2

Repeating Example 1 using only 15 parts of 91% formic acid, a yield of 50% cyanoformamide is obtained.

Example 3

Into an autoclave is fed a mixture containing 12 parts of cyanogen, 57.6 parts of water, 20 parts of formic acid and 40 parts of acetonitrile. The mixture is next heated to 74° C. for three and one-half hours. The reaction mixture is next subjected to vacuum distillation so as to remove water, formic acid and acetonitrile. A good yield of crystalline cyanoformamide (M. P. 47° C.–55° C.) is obtained. It is soluble in water and alcohol and no oxamide is found in the product.

Example 4

16.5 parts of cyanogen, 21.6 parts of water, 36 parts of acetic acid, 60 parts of acetonitrile are admixed and fed into a pressure vessel. The contents therein are heated to 74° C. and maintained at the latter temperature for a total of 15 hours. Excess water, acetic acid and acetonitrile are removed by vacuum distillation. Crystalline cyanoformamide in 54% yield is obtained when worked up as in Example 2.

Example 5

Into a pressure vessel is introduced a mixture containing 15 parts of cyanogen, 21.6 parts of water, 57 parts of chloroacetic acid and 60 parts of acetonitrile. The contents are heated to 75° C. for a total of 15 hours. Excess water, chloroacetic acid and acetonitrile are removed by vacuum distillation. Crystalline product (cyanoformamide) is obtained in 20% yield; oxamide is not detectable in the product.

Example 6

Into an autoclave is charged a mixture of 17.5 parts of cyanogen, 21.6 parts of water, 30 parts of formic acid and 67 parts of tetrahydrofuran. The mixture is then heated to about 74° C. for three and one-half hours. Resultant reaction mixture is next distilled under reduced pressure.

A residue crystallizes on cooling to room temperature. The yield of cyanoformamide is 67% and no oxamide is found in the product.

*Example 7*

A mixture of 16.5 parts of cyanogen, 5.4 parts of water, and 174 parts of formic acid is fed into an autoclave and heated for 50 hours at 75° C. Resultant liquid product is next distilled under reduced pressure to give a liquid which crystallized on cooling. The latter crystallized compound is cyanoformamide. The latter is subjected to recrystallization from ether, having a melting point of between 60° C. and 62° C. Its yield is about 38%.

*Example 8*

A mixture containing 15 parts of cyanogen, 21.6 parts of water, 67 parts of tetrahydrofuran and 120 parts of lauric acid is fed into an autoclove and heated to about 74° C. for 15 hours. The reaction mixture is then cooled and dissolved in petroleum ether. Cyanoformamide is extracted from the petroleum ether with water. Separation of the cyanoformamide from water is accomplished by vacuum distillation under reduced pressure. A good yield of cyanoformamide is obtained.

*Example 9*

Into an autoclave is fed a mixture containing 16 parts of cyanogen, 21.6 parts of water, 35 parts of succinic acid and 67 parts of tetrahydrofuran. The mixture is heated for about 15 hours at about 74° C. The reaction mixture is next distilled under reduced pressure. Cyanoformamide is extracted from resultant solid residue with ether and further purified by recrystallization from ether. A good yield of cyanoformamide is obtained.

*Example 10*

The adverse effect of using less than one equivalent of water is illustrated.

A mixture of 16.5 parts of cyanogen, 5.4 parts of water, 60 parts of acetonitrile and 14 parts of formic acid is introduced into an autoclave and heated to about 65° C. for 15 hours. The reaction mixture is then distilled under reduced pressure. Crystalline residual residue is cyanoformamide obtained on cooling. No oxamide is found in the product which is obtained in about 5% yield.

*Example 11*

To illustrate the adverse effect of using less than one equivalent of formic acid, a mixture of 15.5 parts of cyanogen, 21.6 parts of water, 60 parts of acetonitrile, but only 3 parts of formic acid is fed into a pressure vessel and heated to 74° C. for a total of 3.5 hours. The contents are then vacuum distilled to obtain crystalline cyanoformamide as a residue in a yield of 4%. No oxamide is detectable in the product.

*Example 12*

To illustrate the use of cyanoformamide as a solvent for polyacrylonitrile, 50 parts of polyacrylontrile crumb in the form of a gelatinous mass is added to 450 parts of molten cyanoformamide. The mixture is stirred until a viscous solution results which then solidifies upon cooling. However, upon reheating the mass, a clear solution of dissolved polyacrylonitrile is again obtained. Resultant clear solution is extruded through a spinneret maintained at a temperature of approximately 75° C. The extruded material is fed into a coagulating bath of water maintained at a temperature of approximately 70° C. A filament or thread of polymeric acrylonitrile is formed. Films are produced when the hot solution is poured onto a warm surface, such as glass, and permitted to cool.

I claim:

1. A process for the preparation of cyanoformamide which comprises: bringing into reactive combination under autogenous pressure a mixture comprising cyanogen, water and an aliphatic carboxylic acid, all being present in at least equivalent amounts; and recovering cyanoformamide from the resultant reaction mixture.

2. A process according to claim 1 in which the reaction mixture is conducted at a temperature from about 50° C. to 90° C.

3. A process according to claim 1 in which the carboxylic acid is formic acid.

4. A process according to claim 1 in which the carboxylic acid is acetic acid.

5. A process according to claim 1 in which the carboxylic acid is chloroacetic acid.

6. A process according to claim 1 in which the carboxylic acid is lauric acid.

7. A process according to claim 1 in which the carboxylic acid is succinic acid.

8. A process according to claim 1 in which a diverse inert polar solvent is provided.

9. A process according to claim 8 in which the diverse inert solvent is acetonitrile.

10. A process according to claim 8 in which the diverse inert solvent is tetrahydrofuran.

References Cited in the file of this patent

Baketow: Beilstein's Handbuch (4th edition), vol. 2, p. 549 (1920).